US008731001B2

(12) United States Patent
Roman et al.

(10) Patent No.: US 8,731,001 B2
(45) Date of Patent: May 20, 2014

(54) METHODS AND APPARATUS FOR DETERMINING PARTICIPANTS IN COORDINATED MULTI-POINT TRANSMISSION

(75) Inventors: Timo E. Roman, Espoo (FI); Tommi T. Koivisto, Espoo (FI); Mihai Enescu, Espoo (FI); Karol Schober, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 344 days.

(21) Appl. No.: 13/149,067

(22) Filed: May 31, 2011

(65) Prior Publication Data
US 2012/0307704 A1 Dec. 6, 2012

(51) Int. Cl.
*H04W 56/00* (2009.01)
(52) U.S. Cl.
USPC .......................................... 370/503; 370/329
(58) Field of Classification Search
CPC ...... H04J 3/0638; H04J 3/0685; H04J 3/0632
USPC ......... 370/329, 324, 328, 332, 333, 350, 431, 370/503, 519; 455/436, 450, 524, 525, 68, 455/69
See application file for complete search history.

(56) References Cited

U.S. PATENT DOCUMENTS

| 8,406,171 | B2 * | 3/2013 | Onggosanusi et al. | ....... 370/328 |
|---|---|---|---|---|
| 2011/0034171 | A1 | 2/2011 | Choi et al. | ................... 455/436 |
| 2011/0070884 | A1 | 3/2011 | Choi et al. | ................... 455/434 |
| 2011/0085460 | A1 * | 4/2011 | Zhang et al. | .................. 370/252 |
| 2011/0200029 | A1 * | 8/2011 | Farmandar et al. | .......... 370/338 |
| 2012/0275507 | A1 * | 11/2012 | Roman et al. | ................. 375/226 |

FOREIGN PATENT DOCUMENTS

| CN | 101895921 A | 11/2010 |
|---|---|---|
| CN | 101917381 A | 12/2010 |
| EP | 2 437 451 A1 | 4/2012 |
| GB | 2479658 A | 10/2011 |
| KR | 20100138263 A | 12/2010 |
| WO | WO 2010/130101 A1 | 10/2010 |
| WO | WO 2011/017453 A2 | 2/2011 |
| WO | WO 2012/093555 A1 | 12/2011 |

OTHER PUBLICATIONS

"Discussion on Received Timing Difference in Downlink CoMP Transmission", Fujitsu, 3 GPP TSG-RAN1 #56, R1-090950, Feb. 2009, 4 pgs.

(Continued)

*Primary Examiner* — Hanh N Nguyen
(74) *Attorney, Agent, or Firm* — Stanton IP Law

(57) ABSTRACT

Systems and techniques for communication using coordinated multi-point transmission. In one embodiment, an apparatus comprises at least one processor and a memory storing a set of computer instructions. The processor is configured to cause the apparatus to receive information relating to a propagation delay variation between at least a first transmission and a second transmission received at a user equipment. The first transmission is received from a first transmission point and the second transmission is received from a second transmission. The information relating to the propagation delay variation is evaluated and, based on the result of the evaluation, a determination is made as to whether the second transmission point is acceptable as a participant in a cooperative multi-point joint processing transmission to the user equipment.

20 Claims, 5 Drawing Sheets

(56) References Cited

OTHER PUBLICATIONS

"Pseudo Transmission Timing Control using Cyclic Shift for Downlink CoMP Joint Transmission", Fujitsu, 3GPP TSG-RAN1 #57, R1-091956, May 2009, 8 pgs.

"Impact of propagation attenuations and delays of CoMP composite", Samsung, 3GPP TSG RAN WG1 #57bis, R1-092657, Jun. 29-Jul. 3, 2009, 8 pgs.

* cited by examiner

METHODS AND APPARATUS FOR DETERMINING PARTICIPANTS IN COORDINATED MULTI-POINT TRANSMISSION

FIELD OF THE INVENTION

The present invention relates generally to wireless communication. More particularly, the invention relates to improved systems and techniques for avoiding interference in coordinated multipoint transmission.

BACKGROUND OF THE INVENTION

Interest in wireless communication, particularly personal wireless communication, increased more and more during the last few decades, and user demand for the ability to transmit and receive information wirelessly has proven insatiable. Driven by high and growing demand, developers and manufacturers are constantly seeking ways to increase the information that can be transmitted and received by network infrastructure and user equipment (UE). Finding such ways presents increasing challenges, as the desire of users for reliable, high quality service is accompanied by their reluctance to pay increased rates such as might be needed to finance new infrastructure to meet demands for service.

Techniques that allow for efficient use of equipment serve a number of goals. They allow providers to manage their costs, which may lead to increased profits, lower charges to users, or both. They allow providers to avoid the building of new infrastructure, thereby avoiding the need to petition governments for permits to build such infrastructure and avoiding resistance among the public. Efficient use of equipment can be expected to provide the full panoply of benefits that may be expected from increasing services without concomitantly increasing deployment of equipment.

The telecommunications industry is continually introducing techniques aimed at increasing efficiency and service levels. One such technique is orthogonal frequency division multiplexing (OFDM), which distributes data across subcarriers at closely spaced frequencies in order to achieve a higher overall data rate than the rate per subcarrier.

Another technique that is gaining attention is coordinated multipoint transmission, which is directed to coordination of communication to a given UE among different transmission points.

Wireless communication systems typically comprise numerous and widespread infrastructure elements, organized and allocated in various ways so that a particular UE is identified with the elements serving it at a particular time. Many UEs are served by different elements at different times. For example, a UE may switch between serving elements as it moves from one geographic location to another. Transmissions from elements serving one UE can have significant detrimental impacts on UEs being served by different elements, and coordinated multi-point communication allows for coordination of transmissions among elements to reduce such detrimental impacts and, indeed, to allow for improved transmission quality through simultaneous transmission of the same data to the same UE by multiple serving elements.

Many wireless communication systems are organized into cells. A cell may be thought of as a geographic region served by infrastructure identified with the cell. In one exemplary system, service is provided by transmission points distributed throughout the region served by the system, with each cell comprising at least one transmission point, and with each transmission point being associated with a cell.

Each cell and the transmission points within it may be associated with a cell identifier, and the transmission points and other elements associated with a cell may identify themselves to UEs as being associated with that cell. It will be recognized that transmission points may be allocated or identified in numerous ways, and that identification of transmission points with a cell is only one example of such allocation. A transmission point comprises a single antenna, or an array of co-located antennas. In one example, a cell may be served by a single transmission point, comprising a single array of co-located antennas, with the transmission point using an identifier associated with the cell. To take another example, a cell may be served by multiple transmission points, with each of the transmission points comprising an array of co-located antennas, and with each transmission point serving the cell using the same identifier to indicate its association with the cell. Each transmission point may also use its own individual identifier, used separately from and in addition to the cell identifier. One arrangement of multiple transmission points within a cell is the case of a cell using one or more central transmission points and one or more remotely located transmission points in the form of remote radio heads.

Transmission points serving various UEs may engage in coordination with one another in order to provide improved service. In joint processing, transmission points serving various UEs may engage in coordination with one another to cooperate in transmitting the same data to UEs, thereby reducing interference with one another and generally increasing spectral efficiency of the system. Various notable impacts on service may occur when a UE being served by a transmission point within one cell encounters transmissions directed to a UE within a different cell by a transmission point serving that cell, but it will be recognized that impacts on service may be caused by transmission points operating in the same cell or in systems in which transmission points are not allocated to cells, and coordination between transmission points may be used whenever appropriate whether the transmission points belong to the same cell or different cells, or whether the system is organized into cells at all.

In systems that are organized into cells, each cell is served by one or more transmission points, and the transmission points may coordinate communication with UEs in a number of ways directed to improve service. Coordination of communication can be expected to yield improvements by increasing the average cell throughput, and is also particularly useful in reducing interference encountered by UEs operating near the edges of cells, thereby enhancing the cell coverage A cell edge is a region between adjacent cells, so that UEs near an edge of a cell will be serviced by a transmission point serving the cell but can also be expected to be exposed to relatively strong signals from transmission points serving adjacent cells.

Such issues may also arise in cases in which UEs are within range of multiple transmission points generally, whether or not those transmission points belong to different cells. A transmission point can be expected to have an effective coverage area, with detectable transmissions extending beyond the effective coverage area. A UE being served by a first transmission point, but within a range at which it can detect signals from a second transmission point, may be subject to interference from the second transmission point whether or not the two transmission points happen to be serving different cells.

Transmission points serving various UEs may engage in coordination with one another in order to provide improved service. For example, in one technique known as coordinated scheduling/beamforming, transmission points may coordinate their scheduling or spatial precoding weights to reduce impacts on UEs they are not immediately serving. The transmission points may coordinate their scheduling and choice of precoding weights over each sub-band. Such coordinated scheduling of UEs over a sub-band helps to insure that the UEs experience minimal interference from one another and that each of the UEs experiences minimum interference from transmissions directed to a different one of the UEs.

In joint processing, transmission points may engage in coordination to jointly transmit data to the UE. Multiple transmission points within range of a UE may therefore serve the same UE at the same time and thus provide stronger signals rather than cause interference. Such a technique increases spectral efficiency of a communication system.

SUMMARY OF THE INVENTION

In its various aspects, embodiments of the present invention recognize that various techniques used to improve spectral efficiency may each present their own set of challenges and constraints, so that understanding and dealing with the challenges and constraints presented by a technique is needed in order to achieve its full benefit. In addition, the simultaneous use of multiple techniques directed to achieving improved spectral efficiency may require careful coordination in order to avoid spectral efficiency loss or throughput loss. One technique of particular interest in the context of various embodiments of the present invention is joint processing. Joint processing has the potential to provide significant improvements in efficiency.

In joint processing, multiple transmission points coordinate their transmission to a single UE. All transmission points involved in a joint processing transmission to a UE transmit the same data to the UE and coordinate their transmission so as to insure that the transmission from each transmission point arrives at the UE at the same time. Thus, when joint processing operates as intended, the UE receives what is equivalent to a single transmission from multiple transmission points, as opposed to a transmission from a single serving transmission point, subject to interference by other transmission points.

Joint processing is, however, subject to various obstacles that need to be overcome in order to achieve the gains it can provide. Transmission points are typically separated in space from one another, and can be expected to lie at different distances from a UE or to be otherwise subject to various conditions that result in differing travel times for transmissions from different transmission points. Therefore, transmissions from different transmission points to a single UE may be expected to exhibit different propagation delays. A jointly processed transmission received at a UE may be thought of as a single transmission comprising a plurality of components, with the transmission as experienced by the UE exhibiting propagation delay variations or, equivalently, phase variations, between the received components. The equivalent downlink coordinated multi-point channel from multiple transmission points to a given UE may be viewed as a composite channel with an aggregated delay profile assembled from each transmission channel between a UE and a transmission point communicating with the UE. For example, if five transmission points are engaging in joint processing transmission to a UE, the aggregated delay profile of the composite channel appearing between the transmission points and the UE can be assembled from the five individual transmission channels between the UE and each of the five transmission points. The overall delay spread of such a coordinated multi-point composite channel is typically greater than the delay spread of any one channel between a transmission point and the UE.

Even though various techniques exist to compensate difference in propagation delays, the delay differences between transmission points may be too large to provide coherent joint processing gains from joint transmission coordinated between such transmission points. For example, if the relative delay exceeds the duration of the cyclic prefix, the corresponding excessive phase variation in frequency domain makes the delay difficult to estimate or relative delay is simply too large be compensated by the transmission point.

Various embodiments of the invention therefore provide mechanisms to allow a UE to identify particular transmission points or combinations of transmission points for which the propagation delay differences are too great to allow for effective joint processing coordination and to exclude transmission points whose inclusion would result in excessive propagation delay spreads in a coordinated transmission. Various embodiments of the invention also recognize that propagation delay differences induce phase variation in the frequency domain, and provide mechanisms to allow a UE to identify transmission points or combinations of transmission points for which the phase variation induced by the propagation delay differences are too great to allow for effective joint processing coordination.

According to a first embodiment of the invention, an apparatus comprises a processing system comprising at least one processor and a memory storing a set of computer instructions. The processing system is configured to cause the apparatus to receive information indicative of propagation delay variation between at least a first transmission and a second transmission received at a user equipment. The first transmission is received from a first transmission point and the second transmission is received from a second transmission point. The processing system is further configured to cause the apparatus to evaluate the information relating to the propagation delay variation and, based on the evaluation, determine if the second transmission point is acceptable as a participant in a cooperative multi-point joint processing transmission to the user equipment.

According to a second embodiment of the invention, an apparatus comprises a processing system comprising at least one processor and a memory storing a set of computer instructions. The processing system is configured to cause the apparatus to determine variation information relating to propagation delay variation between at least a first transmission from a first transmission point and a second transmission from a second transmission point, in which the determination of the variation information is based at least in part on a propagation delay. The processing system is further configured to cause the apparatus to report the variation information to a network element managing coordinated multi-point transmission in a communication network and to report channel state information. The channel state information comprises an indication as to whether the channel exhibits an excessive propagation delay spread.

According to a third embodiment of the invention, a method comprises receiving information relating to a propagation delay variation between a first transmission and a second transmission received at a user equipment operating in a wireless communication network. The first transmission is received from a first transmission point and the second transmission is received from the second transmission point. The method further comprises evaluating the information relating to the propagation delay variation and, based on the result of the evaluation, determining if the second transmission point is acceptable as a participant in a cooperative multi-point joint processing transmission to the user equipment.

According to a fourth embodiment of the invention, an apparatus comprises a processing system comprising at least one processor and a memory storing a set of computer instructions. The processing system is configured to cause the apparatus to receive a coordinated multi-point joint processing transmission. The processing system is further configured to evaluate information relating to a propagation delay variation between different received signal components of the transmission and, based on the evaluation, determine whether the propagation delay variation is within acceptable limits.

These and other embodiments and aspects are detailed below with particularity.

DETAILED DESCRIPTION OF THE PREFERRED EMBODIMENTS

Systems and techniques according to various embodiments of the present invention address the effects of propagation delay differences between a reference transmission point and each of various other transmission points that may be engaging in joint processing transmission to a UE, or may be candidates to engage in such joint processing transmission. Propagation delay differences present obstacles to effective joint processing communication from multiple transmission points. Various systems and techniques have been put forward to overcome such obstacles, including U.S. patent application Ser. No. 13/095,241, directed to Methods and Apparatus for Compensating for Propagation Delay Differences in Coordinated Multi-Point Transmission, filed Apr. 27, 2011, assigned to the assignee of the present invention and incorporated herein by reference in its entirety. However, this approach and various other approaches all have some limit on the propagation delay variation that they can address. Excessive propagation delay variation may exceed the duration of the cyclic prefix or cause difficulties in estimation that cannot be overcome. Various embodiments of the present invention described below and depicted in the accompanying drawings address mechanisms for identifying a transmission point or groups of transmission points whose transmissions exhibit excessive variations and excluding potential transmission points or groups of transmission points whose transmissions exhibit excessive propagation delays with respect to a reference transmission point.

Figure 1:
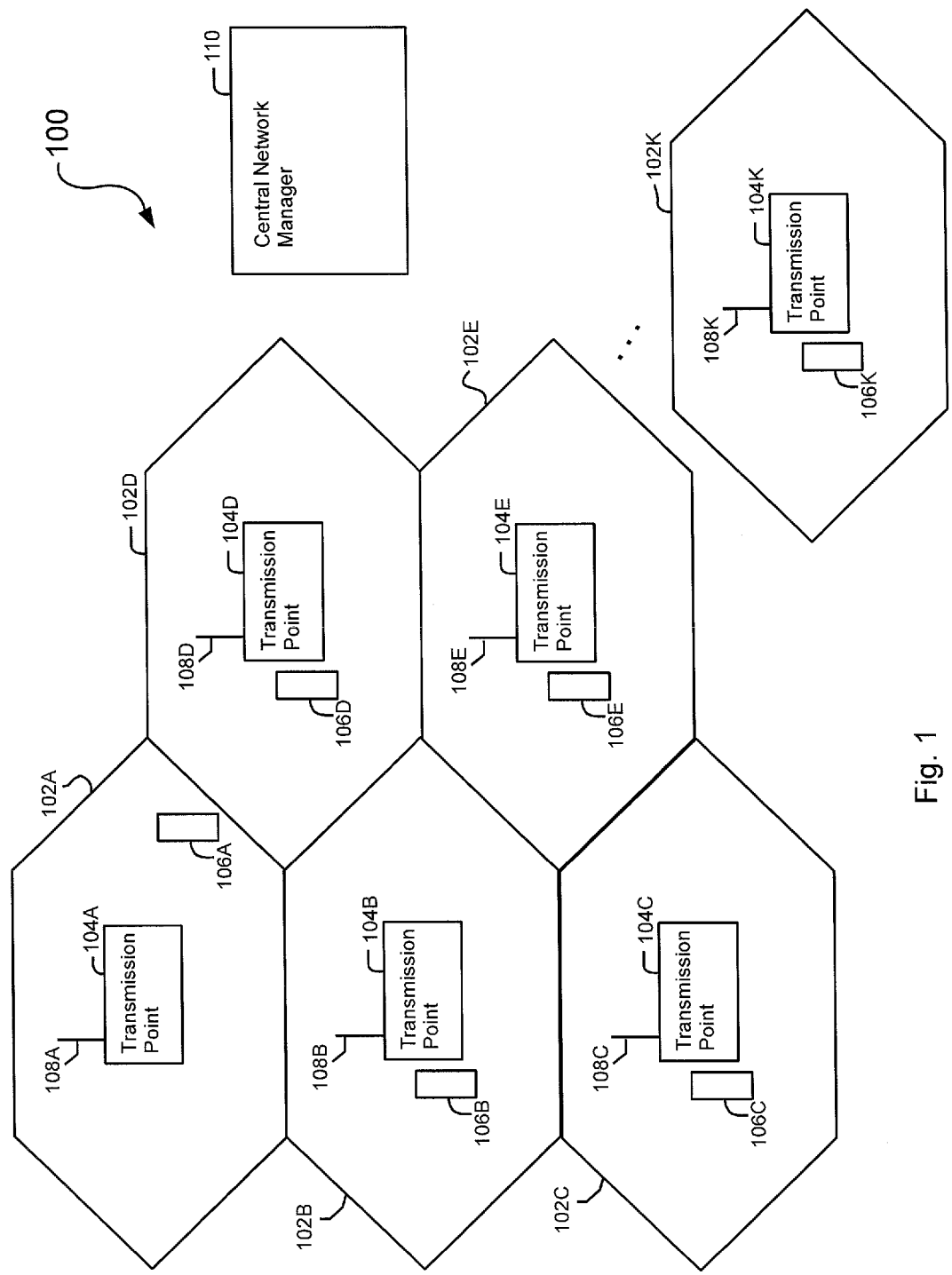
FIG. 1 illustrates a wireless communications network according to an embodiment of the present invention.

FIG. 1 illustrates a wireless communication network 100 according to an embodiment of the present invention. The network 100 operates in a plurality of cells 102A, 102B, . . . , 102K. In the interest of simplicity, only the cells 102A-102E and 102K are illustrated here, but it will be recognized that a network such as the network 100 will typically comprise a large number of cells. The cells represent geographic areas, each served by one or more transmission points, with the transmission points serving each of the cells represented here as transmission points 104A, . . . , 104K, respectively. The transmission points 104A, . . . , 104K serve user equipments (UEs) 106A, . . . , 106K, of which the representative UEs 106A-106E and 106K are illustrated here. A UE may be any suitable device used in wireless communication. It will be recognized that such devices vary widely in their features and functions. A UE may be, for example, a mobile telephone possessing a wide range of features, such as voice communication and a wide variety of data communication capabilities, such as Internet access, short message service, instant messaging, audio and video streaming, and numerous other capabilities. A UE may also be a device possessing a significantly narrower range of capabilities than a mobile telephone, and may be, for example, a device used to provide wireless capability to another device, such as a universal serial bus (USB) dongle, a chipset, or any of a number of other types of devices or modules that can be implemented by or inserted into another device to provide communication capabilities. Any of a wide variety of UEs with widely differing capabilities may employ and benefit from various embodiments of the present invention.

For simplicity, only a few cells and UEs are illustrated and discussed here, but it will be recognized that networks according to embodiments of the present invention may comprise thousands of cells and millions of UEs. For simplicity, each cell is depicted as being served by only one transmission point, but it will be recognized that a cell may be served by multiple transmission points distributed at various locations within the cell, with each transmission point being associated with an identifier for the cell it serves and using the identifier in some or all of its communications. The identifier may, for example, appear in a reference, or pilot, signal transmitted by the transmission point, and may be used by a UE to identify the transmission point and the cell. The identification of the transmission point and the cell may be used by the UE in channel state estimation functions.

In some embodiments, one or more cells may lie fully or partially within a coverage area of another macro-cell. For example, a wireless hotspot is a cell created by a device typically operating in a macro-cell. In other embodiments, distributed antennas within a macro-cell may be represented by remote radio heads, each of which may constitute a transmission point and each of which may be configured to use the same cell identifiers as the macro cell or different identifiers depending on design choices.

The network 100 provides voice and data services and is directed toward providing users with a high data rate. A high data rate may be characterized as a high rate symbol stream arriving at a UE, and to this end, the various transmission points employ transmission protocols directed toward providing such a high rate over the available transmission bandwidth. One such protocol is OFDM transmission of data, distributing data across subcarriers at closely spaced frequencies, so that the total data carried across subcarriers can achieve a high rate while maintaining a transmission rate per subcarrier that is lower than the overall data rate provided.

This use of subcarriers provides a high data rate, but requires careful management to avoid subcarrier interference and, thus, intersymbol interference. Added difficulties arise for UEs that are near the edges of cells, such as the UE 106A, which is near the edge of the cell 102A. The UE 106B is shown as located in the cell 102B, relatively near to the transmission point 104B and therefore away from the edge of the cell 102B. The transmission point 104B transmits signals while serving the UE 106B and other UEs that may be present in the cell 102B, and these signals may affect UEs in neighboring cells. A UE near the edge of a cell is served by the transmission point serving in that cell, but it may be exposed to relatively strong transmitted signals from neighboring cells. Thus, the UE 106A receives and processes signals from the transmission point 104A, but is exposed to signals from the transmission point 104B serving the UEs in the neighboring cell 102B. Other ones of the transmission points may also transmit signals that can affect the UE 106A. These signals from the transmission point 104B and others tend to cause interference affecting the UE 106A, but the network 100 employs various mechanisms according to exemplary embodiments of the present invention to reduce such interference.

In order to reduce interference caused by the various transmission points to the UE 106A, and to generally provide the UE 106A with improved service, various groups of transmission points among the transmission points 104A, . . . , 104K may engage in jointly processed transmission, in which various transmission points transmit the same data over what appears as a composite channel to the UE receiving the transmission. For example, suppose that the transmission points 104A-104E are all engaging in a joint processing transmission to the UE 106A. The geographical separation between the transmission points 104A and 104B, 104A and 104C, 104A and 104D, and 104A and 104E causes propagation delay differences between the received signal components from these transmission points, as experienced by the UE because the UE 106A is synchronized to the transmission point 104A. The geographical separation equivalently causes corresponding frequency domain phase variation. Such propagation delay variation and frequency domain phase variation present significant obstacles to jointly processed transmission, including difficulties in achieving coherent combining gains at the UE 106A, for example.

As noted above, the various transmission points may suitably transmit data using orthogonal frequency division multiplexing. In one example, each OFDM symbol comprises a cyclic prefix. The cyclic prefix of an OFDM symbol is a repetition of the end of the OFDM symbol, and use of the cyclic prefix as a prefix to each OFDM symbol helps to reduce intersymbol interference. When the delay spread of the propagation channel exceeds the cyclic prefix length or duration, inter-symbol interference occurs and breaks the orthogonality of the transmission, requiring a significantly more complex channel equalization procedure by the UE. In addition, even in cases in which the cyclic prefix length is not exceeded, channel estimation presents significant difficulties because the propagation delay spread renders the channel frequency response more frequency selective and hence more difficult to estimate.

A UE such as the UE 106A transmits channel state information (CSI) to the transmission point by which it is served. Such channel state information may be transmitted in the form of uplink feedback signaling, for example. The channel state information comprises information describing known channel properties of the communication link, as experienced by the UE, and allows the transmission point to adapt its transmissions to the channel properties. In the presence of high selectivity caused by propagation delay differences, channel estimation filtering must be adjusted to account for this high selectivity. For example, channel estimation filtering must be adjusted according to a smaller coherence bandwidth with a lower processing gain. Higher density for reference signals used in channel estimation may also be required, leading to increased reference signal overhead, which is in turn detrimental to the overall spectral efficiency of the system.

Furthermore, the high frequency selectivity of the channel affects transmit precoding gain and also requires accurate frequency selective channel state information feedback with very high user equipment feedback granularity in the frequency domain, leading to high or even excessive uplink feedback overhead. These requirements can overwhelm the advantages provided by coordinated multi-point transmission.

Therefore, various embodiments of the present invention address mechanisms for determining when joint processing transmission by a group of transmission points to a UE provides insufficient advantage, or even presents a detriment. Such a determination is particularly worthwhile in light of the fact that out of a group of transmission points, not all will necessarily be suitable for inclusion in a jointly processed transmission. Therefore, identifying transmission points that are unsuitable for a particular jointly processed transmission may allow for the advantages of a jointly processed transmission coordinated among suitable transmission points. In cases when jointly processed communication is not appropriate at all, or when one or more transmission points should be excluded from a jointly processed communication, establishing that fact will avoid inefficient attempts to engage in jointly processed transmission, and may allow for the use of techniques that will provide some advantage, such as coordinated scheduling/beamforming, in which transmission points other than a transmission point serving a UE schedule their own transmission so as to reduce interference. Specific advantages that may be achieved from excluding a transmission point exhibiting a high propagation delay or equivalent phase variation may include reduction of signaling overhead, such as uplink feedback.

One highly useful criterion for determining which transmission points should be included in a joint processing transmission is the propagation delay difference between transmissions from multiple transmission points. Transmissions take time to travel from a transmission point to a UE and transmissions from transmission points at different distances require different travel times. These different travel times manifest themselves in propagation delay differences. Therefore, in an existing or proposed group of transmission points, transmission points whose transmissions exhibit too great a propagation delay difference with respect to other transmission points belonging to or proposed for inclusion in the group will not prove satisfactory participants in a jointly processed transmission.

A number of approaches may be taken to determining when a joint transmission will prove satisfactory and which transmission points should participate in a joint transmission. One approach is for the network 100 to receive indications from a UE, such as the UE 106A, relating to the timing variations of signals from various transmission points within range. The indications may be received, for example, by the UE's serving transmission point, which may be the transmission point 104A in the case of the UE 106A. The transmission point receiving the indications may then determine whether jointly processed transmission should be carried out and which transmission points should participate. An alternative approach is for a UE such as the UE 106A to indicate that a joint transmission that is currently scheduled exhibits an excessive propagation delay spread.

Figure 2:
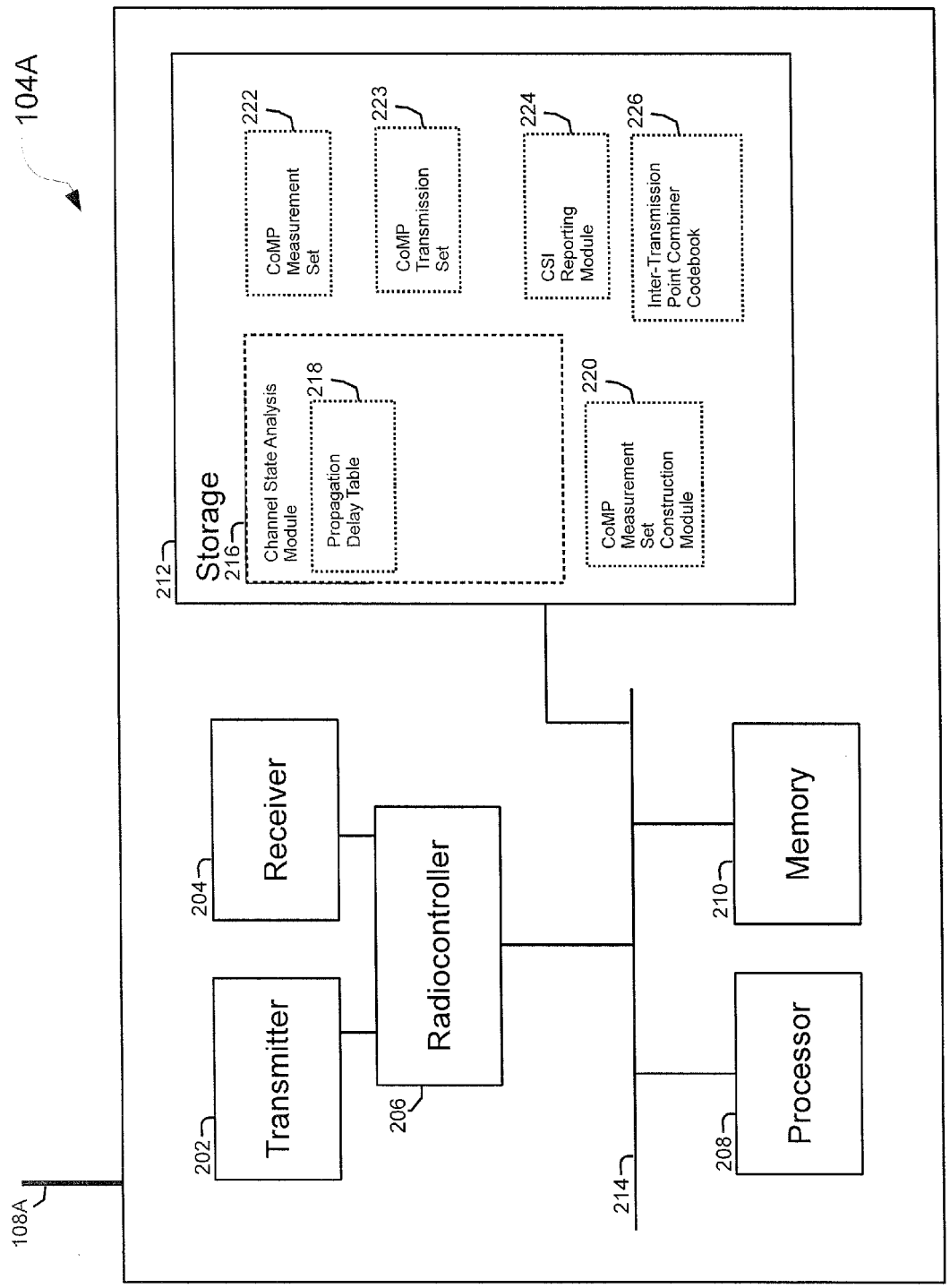
FIG. 2 illustrates details of a transmission point according to an embodiment of the present invention.

FIG. 2 illustrates additional details of the exemplary transmission point 104A, operating in the cell 102A. The transmission point 104A comprises the antenna/antenna array 108A, which may comprise a single antenna or an array of antennas. The transmission point 104A also suitably comprises a transmitter 202, a receiver 204, and a radiocontroller 206. The transmission point 104A further comprises a processor 208, memory 210, and storage 212, communicating over a bus 214. It will be recognized that the transmission points serving other cells may reflect a configuration similar to that of the transmission point 104A, or any of a number of different configurations, so long as the configuration or configurations chosen allow the carrying out of operations needed to avoid excessive timing delay variations between combinations of transmission points performing jointly processed transmission to a UE. The transmission point 104A receives channel state information from a UE such as the UE 106A, and is able to analyze the channel state information to determine which transmission points are to be included or excluded from a jointly processed transmission to the UE, based on the propagation delay variation exhibited by the transmission points.

The channel state information transmitted by a UE such as the UE 106A suitably includes information relating to transmissions received by the UE 106A from transmission points such as the transmission points 104A . . . 104E, including information relating to the suitability of each of the transmission points for participation in a joint processing transmission.

It will be recognized, however, that the determination as to which transmission points are acceptable, and the various computations and comparisons needed for such determination, need not be carried out by the transmission point 104A. Instead, operations directed toward determining which transmission points will be included or excluded may be carried out by one or more entities, such as the central network manager 110, the UE itself, each of the transmission points within range of the UE, or some other combination of entities. The transmission point 104A does, however, present a convenient mechanism for receiving channel state information from a UE such as the UE 106A and either using the information itself or conveying the information to other entities for use. However, it will also be recognized that information relating to the channel conditions experienced by the UE, including information relating to the propagation delay variation between transmission points, can be received by other entities from the UE, rather than being relayed by the transmission point 104A.

It will also be recognized that the UE may make the determination as to which transmission points are to be included or excluded in a joint communication. In such a case, the channel state information transmitted by a UE such as the UE 106A may include a suitably encoded indication identifying transmission points to be included in or excluded from a jointly processed communication.

The transmission point 104A suitably employs a channel state analysis module 216, which may be implemented as a program of instructions residing in storage 212 and transferred to memory 210 as needed for execution by the processor 208. The channel state analysis module 216 receives information such as measurement reports provided by the UE 106A, such as the reference signal received power (RSRP) report furnished by the UE 106A through radio resource control (RRC) signaling. The channel state information reported by the UE 106A may suitably include reference signal received power for each transmission point as well as the delay for each transmit point, and the channel state analysis module 216 may thus receive and analyze information reported by the UE 106A and relating specifically to the transmission point 104A.

The UE 106A may also include information relating to timing delays in the measurement reports. Measurement report information need not indicate absolute timing. Instead, sufficient precision can typically be achieved using information indicating an approximate timing difference between the transmission point under consideration and a reference transmission point.

The channel state analysis module 216 may construct a propagation delay table 218, indicating the propagation delay variation exhibited by each of the transmission points that have been examined. The propagation delay table 218 may be used by a CoMP measurement set construction module 220, which examines the propagation delay for each of the transmission points for which information is stored in the table 218, and determines, for each of the transmission points, if the transmission point should or should not be admitted as a participant in a joint processing transmission to the UE, based on the propagation delay of the transmission point. The information received at the transmission point 104A may simply include an indication as to whether various transmission points are exhibiting excessive delay and are therefore to be excluded from jointly processed communication. Thus, the propagation delay table 218 may store an indication received from the UE 106A with respect to each transmission point under consideration as to whether the transmission point 104A is to be included or excluded.

As an alternative or in addition, the CoMP measurement set construction module 220 may compare the propagation delay information for each of the transmission points against a threshold and select as participants in a joint processing transmission those transmission points whose propagation delay is acceptable in comparison to the threshold.

The CoMP set construction module 220 builds a CoMP measurement set 222 and a CoMP transmission set 223 for the UE. The CoMP measurement set 222 of the UE comprises the transmission points for which the particular UE, in this exemplary case the UE 106A, should collect measurement information. The CoMP set construction module 220 also suitably builds the CoMP transmission set 223, which comprises a selection of transmission points that are eligible to transmit to the UE. The CoMP transmission set 223 is typically constructed from transmission points belonging to the CoMP measurement set 222. As measurements from each of the transmission points in the CoMP measurement set 222 are made and evaluated, the transmission point is admitted to or excluded from the CoMP transmission set 223.

The channel state analysis module 216 passes appropriate information to a channel state information reporting module 224, which manages the transfer of appropriate information to entities that will act on the channel state information. Such entities may, for example, include one or more of the central network manager 110, the UE, and various transmission points identified in the CoMP measurement set 222. The channel state information reporting module 224 conveys elements of information to various entities based on which entities are to perform the various operations. For example, the channel state information reporting module 224 may simply convey the information to the central network manager 110, which then takes on the task of sending information to the elements that are to perform operations.

The transmission points identified in the CoMP measurement set 222 are suitably notified, whether by the transmission point 104A or some other entity, of their inclusion as participants in joint processing transmission to the UE 106A. That is, transmission points belonging to the CoMP measurement set 222 are notified whether they are also members of the CoMP transmission set 223. The transmission points that are members of the CoMP transmission set 223 then perform joint processing transmission according to predetermined criteria governing such operation. The CoMP measurement set 222 is delivered to the UE 106A, and the UE 106A collects and reports measurement information for the transmission points identified in the CoMP measurement set 222. The CoMP measurement set 222 for the UE 106A is specific to the UE 106A and reflects conditions experienced by the UE 106A. Similar CoMP measurement sets for other UEs served by a transmission point are specific to those UEs and reflect conditions that they experience. It may often happen that different UEs measure characteristics of transmissions from the same group of transmission points, but it will be realized that the measurements of a characteristic of a transmission point by different UEs will often yield different values. For example, measurements of transmissions from a transmission point by UEs at different distances from the transmission point will yield different values for propagation delay and phase variation.

For convenience, the channel state analysis module 216, propagation delay table 218, CoMP measurement set construction module 220, CoMP measurement set 222, and channel state reporting module 224 are all presented here as implemented by the transmission point 104A. It will be recognized, however, that these elements may be implemented by any of a number of elements of the network 100. For example, the network manager 110 may be in charge of building CoMP measurement sets throughout the network 100, and in such a case will thus receive channel state information reports and other information relating to the channel conditions experienced by UEs throughout the network. These reports may be received directly by the network manager 110 from UEs within range, particularly if the network manager 110 also acts as a transmission point. The reports may also be relayed to the network manager 110 by transmission points receiving them from UEs.

The procedure described above allows for the network to prevent excessive timing delays from occurring, but may not be able to be used in some cases. In order for the propagation delay information for individual transmission points to be reported, the transmission points must each be able to be uniquely identified. Various mechanisms exist to assist in uniquely identifying transmission points. For example, channel state information reference signal information may be adaptable for use in identifying transmission points. However, in cases in which not all the transmission points can be uniquely identified, such as cases in which multiple transmission points belong to the same logical cell and are all using the same logical cell identifier, and in which alternative mechanisms of identification are not available or are not used, the propagation delay information for some of the transmission points may not be distinguishable, so that individual transmission points exhibiting excessive delay difference may not be able to be identified. In such cases, it is possible for the transmission point 104A, or another entity such as the central network manager 110, to receive information from the UE 106A not identifying individual transmission points for which the propagation delay variation is excessive, but instead indicating that the overall propagation delay difference between transmission points is too great to support joint processing transmission. The transmission point 104A may suitably maintain an inter-transmission point combiner codebook 226, matching a codebook maintained by the UE 106A, and the UE 106A may indicate the availability or unavailability of joint processing transmission by providing feedback indicating the setting of a designated state or bit in the codebook 226. The UE performs channel state reporting, including propagation delay estimation for individual transmission points and for the overall signal, using elements and performing operations described below.

Figure 3:
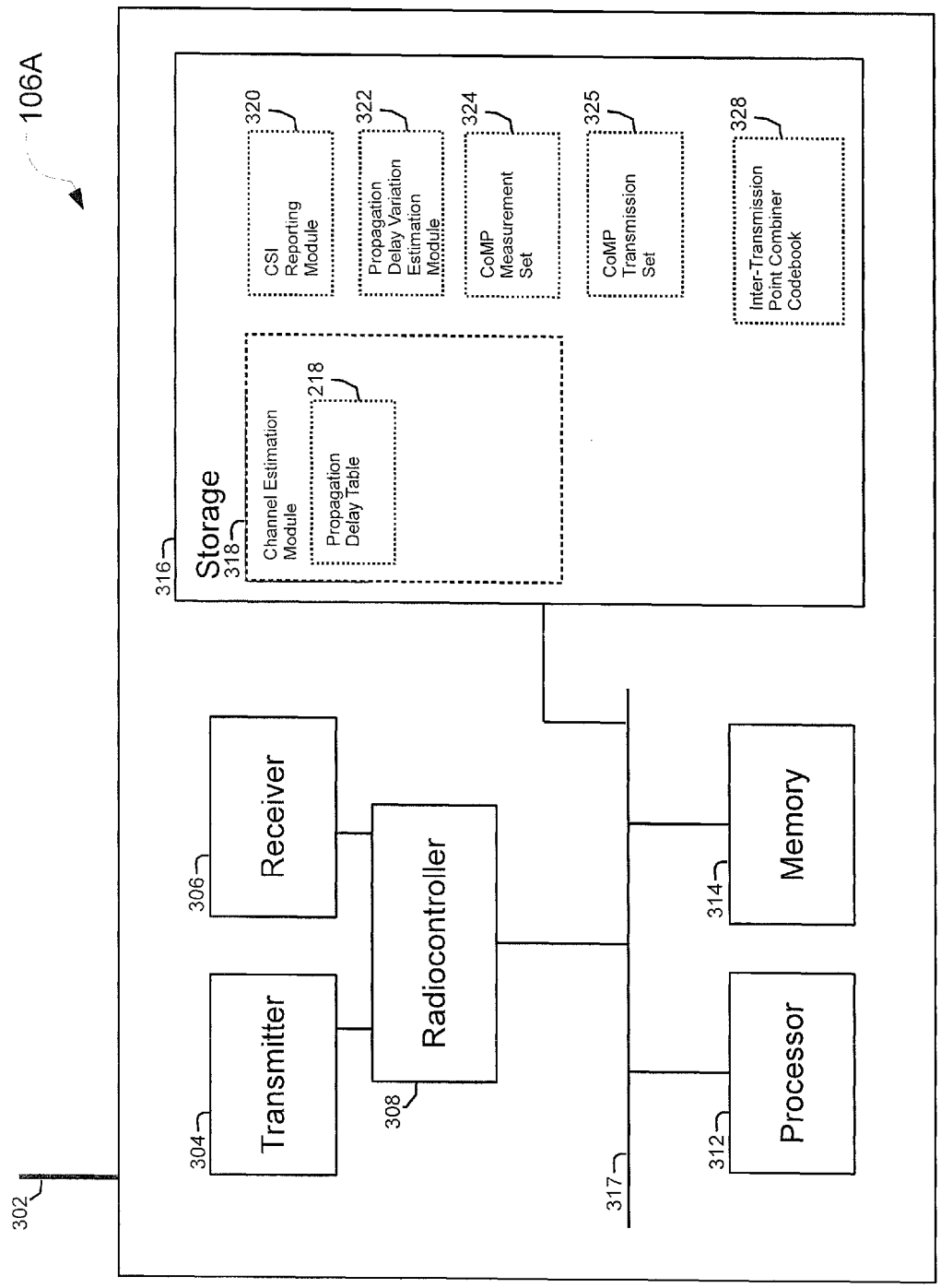
FIG. 3 illustrates details of a user equipment according to an embodiment of the present invention.

FIG. 3 illustrates additional details of the UE 106A. The other UEs 106A, . . . , 106K may be configured similarly to the UE 106A. The UE 106A comprises an antenna 302, a transmitter 304, a receiver 306, and a radiocontroller 308. The UE 106A also comprises a processor 310, memory 312, and storage 314, communicating with one another and with the radiocontroller 308 over a bus 317.

The UE 106A suitably implements a channel estimation module 318, which may be implemented as software residing in storage 316 and transferred to memory 314 as needed for execution by the processor 312. The channel estimation module 318 evaluates various characteristics of the communication channel as it is experienced by the UE. The UE 106A also suitably implements a channel state information (CSI) reporting module 320, which reports channel state information to its serving cell, which in the present example may be controlled by the transmission point 104A. As noted above, the UE 106A performs radio resource management (RRM) measurements as part of its operations, and these measurements may be performed by the channel estimation module 318. The RRM measurements are performed in order to synchronize to transmission points and provide the UE 106A with approximate timing difference information that can be conveyed to a transmission point, such as the transmission point 104A, or another network element. For each transmission point for which a signal measurement is obtained, the RRM measurement provides timing difference information with respect to a reference transmission point, such as the transmission point 104A.

For example, in the case of the UE 106A, the RRM measurement information may include timing difference information between the transmission point 104B and the transmission point 104A, between the transmission point 104C and the transmission point 104A, between the transmission point 104D and the transmission point 104A, and so on. This information may be reported as part of a reference signal received power (RSRP) report sent via uplink (UL) feedback.

The reference transmission point or transmission points to be used may be designated by the channel state analysis module 216 of the transmission point 104A, or by another suitable component, such as the central network manager 110, that manages the evaluation and performance of joint processing operations. Such an approach is particularly valuable in cases in which different groups of transmission points are to be assembled at different times.

If desired, the UE 106A may be configured to perform more precise evaluation. For example, the UE 106A may implement a propagation delay estimation module 322, which may evaluate the propagation delay for each transmission point for which a signal is received. The propagation delay estimation module 322 may directly evaluate propagation delay for a transmission, such as by directly measuring the propagation delay or by examining the phase modulation caused by the propagation delay, as described in the application cited above. The channel state information reporting module 320 may provide the time delay information to the network 100, such as through the transmission point 104A. Appropriate network elements, such as the transmission point 104A or the central network manager 110, may then evaluate the time delay information and determine which transmission points are acceptable as participants in a joint processing transmission to the UE 106A. As noted above, in the present example, the transmission point 104A constructs the CoMP measurement set 222, and provides it to the UE 106A. The UE 106A stores a counterpart CoMP measurement set 324, and, as noted above, uses it to identify transmission points for which measurements are to be made and reported. The UE 106A also stores a CoMP transmission set 325 that is a counterpart to the CoMP transmission set 223, and that identifies transmission points that are to be participants in a jointly processed transmission.

Alternatively, the channel estimation module 318 may itself evaluate the time delay information for each of the transmission points against one or more predetermined criteria, and may provide an indication to the network 100 identifying which transmission points should participate in jointly processed transmission based on the result of the evaluation. The channel estimation module 318 may construct the CoMP measurement set 324 and CoMP transmission set 325 by itself, rather than receiving them from the transmission point 104A or another entity. The channel estimation module 318 may use one or more predetermined threshold values or may develop its own threshold values during operation, or may receive threshold values from the transmission point 104A or from another network entity such as the central network manager 110. Once the channel estimation module 318 has constructed the CoMP measurement set, the channel state information reporting module 320 may report channel conditions in terms of the actual construction of the CoMP measurement set 324 and CoMP transmission set 325. For example, the channel state information reporting module 320 may identify transmission points that should participate in a joint processing transmission to the UE 106A, and thus should be included in the CoMP transmission set 325. In another approach, the channel state information reporting module may identify transmission points that exhibit a propagation delay or phase variation that has been determined by the channel estimation module to be excessive. The transmission point 104A or other network entity determining participants in a jointly processed transmission may exclude from consideration transmission points that the UE 106A has identified as exhibiting an excessive propagation delay or phase variation.

As noted above in the discussion of the transmission point 104A, the above procedures are directed toward identifying a group of transmission points that will participate in jointly processed transmission. As an alternative to identifying, or providing information used to identify, a group of transmission points that will participate in jointly processed transmission, the UE 106A may evaluate a signal that is already being transmitted from a group participating in jointly processed transmission. The channel state information module 318 typically performs channel state information-reference signal (CSI-RS) measurements as a normal part of CSI feedback, and the propagation delay variation estimation module 322 may determine from these measurements that the timing difference between transmission points is too great to support joint processing. In addition, each transmission point will typically be visible to the UE as an antenna port associated to a CSI-RS symbol sequence, and these reference symbols may be used to distinguish transmission points from one another.

The CSI reporting module 320 may report information using an inter-transmission point combiner codebook 328 which is a counterpart to the codebook 226 maintained by the transmission point 104A and used to efficiently convey various details relating to the channel state detected by the UE 106A. As noted above, the codebook 328 may include a bit or state indicating whether the measured timing delays allow for jointly processed transmissions using the current set of transmission points. For example, a combiner codebook may consist of three 3-phase shift keying (PSK) codewords and one switch-off codeword.

In addition or as an alternative to reporting that joint processing cannot be advantageously carried out, the channel state estimation module 318 may be able to identify a transmission point whose presence is causing excessive variation. The CSI reporting module 320 may then include the identification of such a transmission point in its report of channel information, and this identification may be used to remove the transmission point in question from the set of participants in the jointly processed transmission. For example, in the case of a combiner codebook consisting of 3-PSK codewords and a switch-off codeword, reporting of the switch-off codeword may be used to indicate that the propagation delay associated with a transmit point is too great to allow for inclusion of the transmission point in a joint processing transmission. However, in such a case, the channel state information feedback may be used to allow for coordinated scheduling/beamforming with respect to the excluded transmission point or other purposes besides joint transmission.

The propagation delay information may be determined by measuring or examining timing delay information, such as timing delay measurements between transmissions received from a transmission point under examination and corresponding transmissions from a reference transmission point. In addition, or as an alternative, the propagation delay information may be determined by examining phase variation information. As noted in the U.S. patent application cited above, propagation delay variation causes a phase modulation in the form of a linear phase variation, and the phase modulation can be measured in the frequency domain to determine the timing delay equivalent to the phase variation. Phase variation can also be evaluated against an appropriate threshold or otherwise used to perform operations or make decisions without a need to perform any sort of conversion between phase information and timing information. Therefore, the propagation delay estimation module 322 may operate using timing or frequency information, as desired.

Figure 4:
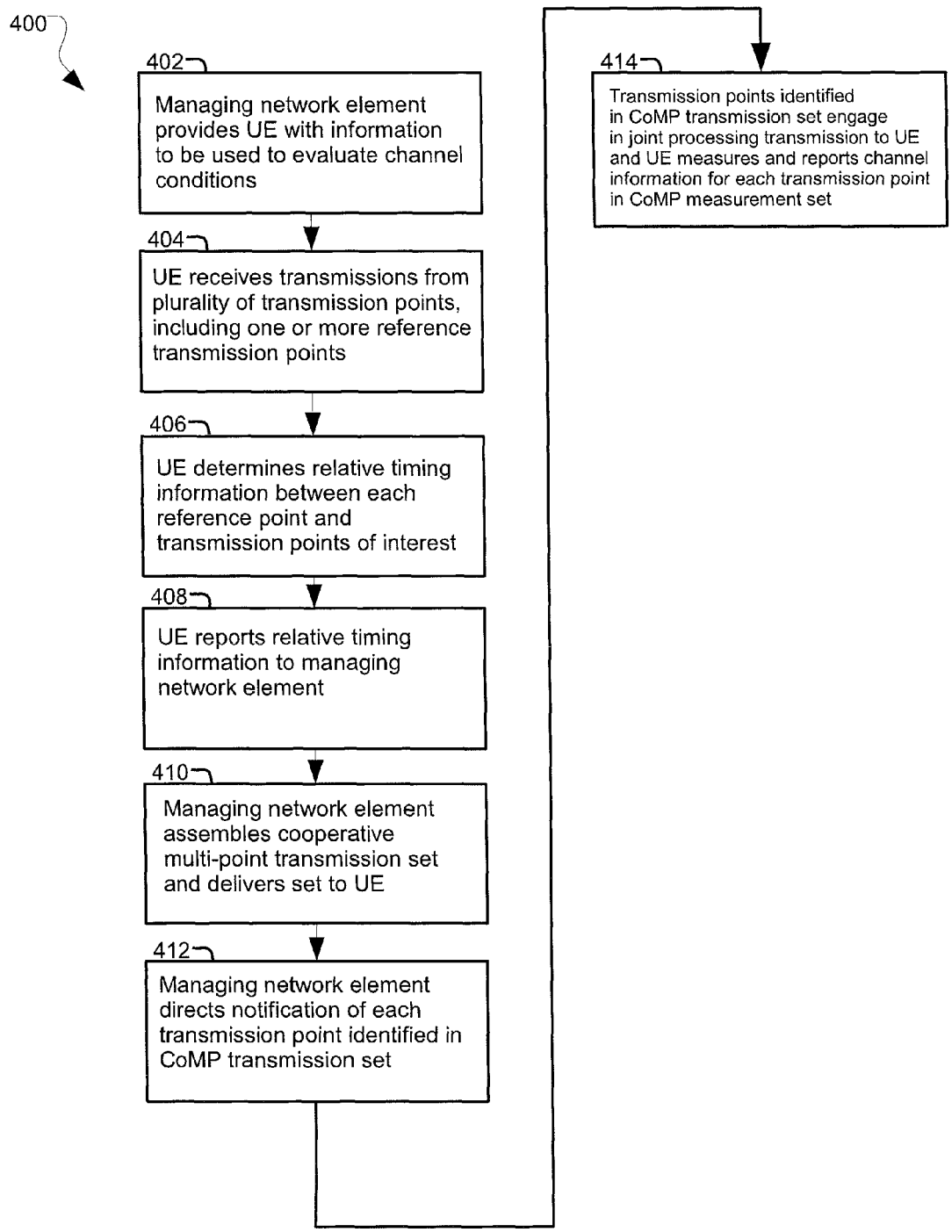
FIG. 4 illustrates a process of coordinated multi-point transmission according to an embodiment of the present invention.

FIG. 4 illustrates a process 400 of cooperative multi-point joint processing transmission according to an embodiment of the present invention. At step 402, a managing network element directing joint processing transmission to a UE provides the UE with information to be used to evaluate the channel condition as that condition is experienced by the UE. The information may include an identification of a reference transmission point or set of transmission points against which transmission points under examination are to be evaluated in terms of propagation delays. The information may also include threshold values, that is, maximum propagation delay difference information to be used to determine whether a transmission point exhibits acceptable performance. At step 404, the UE receives transmissions, such as channel state information reference signal (CSI-RS) transmissions from a plurality of transmission points, including one or more reference transmission points. At step 406, the UE determines channel state information based on the transmissions. The channel state information may include relative timing information between each reference transmission point and one or more transmission points of interest. Such relative timing information may be determined based on direct timing difference information or phase variation information. The channel state information may also include identification of transmission points whose transmissions exhibit an excessive propagation variation, measured as timing variation or frequency phase variation, with respect to transmissions received from the reference transmission points. Alternatively or in addition, the channel state information may include identification of each transmission point for which a transmission was evaluated as being suitable or unsuitable for jointly processed transmission to the UE.

At step 408, the UE reports the channel state information to the managing network element, which evaluates the channel state information as it relates to determining a set of transmission points for jointly processed transmission. For example, if the channel state information simply includes relative timing information, the managing network element may compare the relative timing information for each of the transmission points under examination against a threshold. To take another example, if the channel state information identifies transmission points as exhibiting an excessive propagation variation, the managing network element may exclude the identified transmission points from participation in jointly processed transmission, and if the channel state information identifies both suitable and unsuitable transmission points, the managing network element may allow inclusion of the transmission points identified as suitable.

At step 410, the managing network element assembles a cooperative multi-point transmission set identifying the transmission points to be included as participants in a joint processing transmission with the UE. The managing network element assembles in addition a cooperative multi-point measurement set, and delivers the latter set to the UE. This cooperative measurement set consists of the transmission points for which the UE collects and reports channel state information, and the cooperative measurement set identifies the transmission points to be potentially included as participants in a joint processing transmission with the UE. The cooperative multi-point transmission set will typically be a subset of the cooperative multi-point measurement set. Depending on conditions, this subset may include as many as all of the transmission points for which channel information is collected and reported.

At step 412, the managing network element directs notification of each transmission point that is to be included in the cooperative multi-point transmission set. These may suitably comprise the reference transmission point or points as well as the transmission points that passed evaluation. At step 414, the transmission points identified in the cooperative multi-point transmission set engage in joint processing transmission to the UE and the UE measures and reports channel information for each of the transmission points in the transmission set, as well as the measurement set as a whole, which typically includes the transmission set as well as any additional transmission points for which channel information is to be measured and reported but which are excluded from the cooperative multi-point transmission set.

Figure 5:
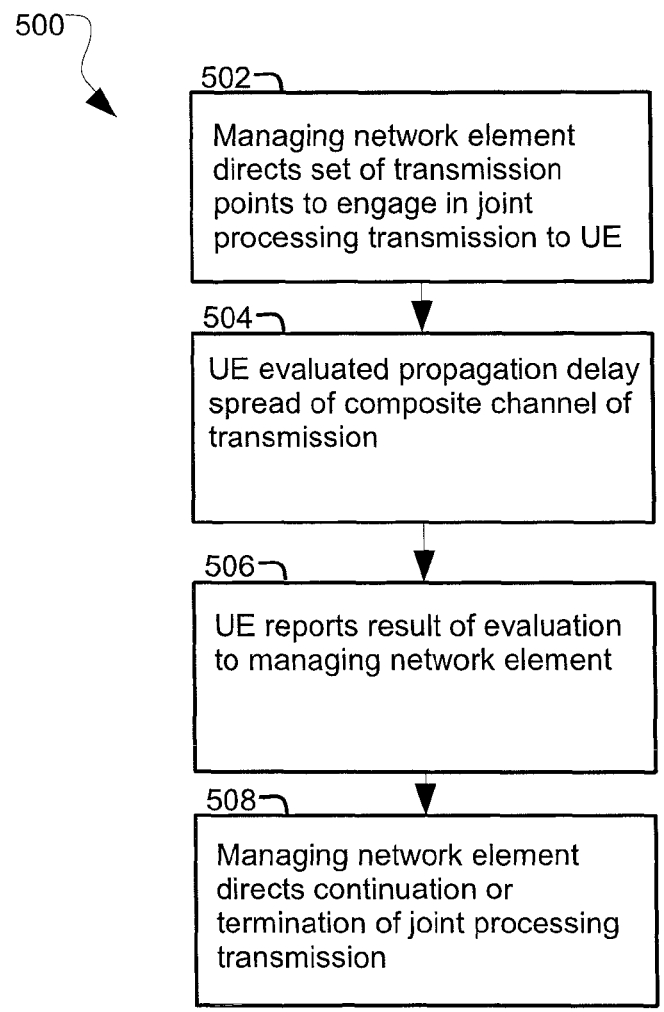
FIG. 5 illustrates a process of coordinated multi-point transmission according to an alternative embodiment of the present invention.

FIG. 5 illustrates an alternative process 500 of cooperative multi-point joint processing transmission according to an embodiment of the present invention. At step 502, a managing network element directs a set of transmission points to engage in joint processing transmission to a UE. At step 504, the UE evaluates the propagation delay spread of the composite channel of the transmission. Evaluation may be performed using a threshold value stored in or determined by the UE, or by a threshold value provided by the managing network element, and may be accomplished through timing or phase estimation as desired. The evaluation may simply determine if the propagation delay spread is excessive and cannot be advantageously continued, or may include an identification of one or more transmission points exhibiting an excessive propagation delay and thus causing or significantly contributing to the excessive propagation delay spread.

At step 506, the UE reports the result of the evaluation to the managing network element. Reporting may be accomplished, for example, by transmitting one or more states or bits corresponding to appropriate entries in a codebook stored by the UE, with the managing network element storing an equivalent codebook so that the state or bit corresponds to an equivalent entry in the codebook stored by the managing network element. At step 508, the managing network element directs continuation, changing, or termination of the joint processing transmission to the UE, depending on the report by the UE. For example, if transmission points have been identified as exhibiting excessive propagation delays, these may be excluded from jointly processed transmission, or if the evaluation simply indicates an overall excessive variation, the jointly processed transmission may be terminated.

While various specific embodiments of the invention are described above, it will be recognized that a wide variety of implementations may be employed by persons of ordinary skill in the art in accordance with the above description and the claims which follow below.

We claim:

1. An apparatus comprising:
a processing system comprising at least one processor and a memory storing a set of computer instructions, wherein the processing system is configured to cause the apparatus at least to:
receive information indicative of a propagation delay variation between at least a first transmission and a second transmission received at a user equipment, the first transmission being received from a first transmission point and the second transmission being received from a second transmission point;
evaluate the information relating to the propagation delay variation; and
based on the evaluation, determine if the second transmission point is acceptable as a participant in a cooperative multi-point joint processing transmission to the user equipment in which participants coordinate transmission of same data to arrive at the user equipment at a same time,
wherein the information relating to the propagation delay variation comprises one or more of:
information that phase modulation between the first and second transmissions is too great for advantageous jointly processed transmission, and
information that a time offset between the first and second transmissions is too great for advantageous jointly processed transmission.

2. The apparatus of claim 1, wherein the processing system is configured to cause the apparatus to:
in addition to receiving information indicative of propagation delay variations between the first transmission and the second transmission, receive information indicative of propagation delay variations between the first transmission and each of a plurality of additional transmissions, each of the additional transmissions being received from a respective additional transmission point;
for each of the additional transmissions, perform an evaluation of the information relating to the propagation delay variation between the additional transmission and the first transmission; and
based on each of the evaluations, determine if the transmission point for whose transmission the evaluation was performed is acceptable as a participant in a cooperative multi-point jointly processed transmission to the user equipment.

3. The apparatus of claim 2, wherein the information relating to the propagation delay variation comprises an identification of one or more transmission points as ineligible for advantageous jointly processed transmission.

4. The apparatus of claim 1, wherein the apparatus is a central network manager controlling a plurality of transmission points.

5. The apparatus of claim 1, wherein the information relating to the propagation delay variation comprises an indication that the variation between the first and the second transmissions is too great for advantageous jointly processed transmission.

6. The apparatus of claim 1, wherein the processing system is configured to construct a cooperative multi-point set identifying at least two transmission points determined to be acceptable as a participant in a joint processing transmission to the user equipment.

7. An apparatus comprising:
a processing system comprising at least one processor and a memory storing a set of computer instructions, wherein the processing system is configured to:
cause the apparatus to determine variation information relating to propagation delay variation between at least a first transmission from a first transmission point and a second transmission from a second transmission point, in which the determination of the variation information is based at least in part on a propagation delay;
cause the apparatus to report the variation information to a network element managing coordinated multi-point joint processing transmission in a communication network in which participants coordinate transmission of same data to arrive at a user equipment at a same time; and
cause the apparatus to report channel state information, the channel state information comprising an indication as to whether the channel exhibits an excessive propagation delay spread,
wherein the variation information comprises one or more of phase modulation information and time offset information.

8. The apparatus of claim 7, wherein the channel state information comprises a report indicating that the channel is unacceptable for jointly processed transmission.

9. The apparatus of claim 7, wherein the channel state information includes an identifier for a transmission point whose transmissions exhibit propagation delay variation unacceptable for jointly processed transmission.

10. The apparatus of claim 7, wherein the apparatus comprises a user equipment in a wireless communication network.

11. The apparatus of claim 7, wherein the processing system is configured to cause the apparatus to determine, in addition to variation information between the first transmission and the second transmission, variation information between the first transmission and each of a plurality of additional transmissions, each of the additional transmissions being received from a respective additional transmission point.

12. The apparatus of claim 7, wherein reporting of the variation information comprises reporting a comparison of the variation information against a threshold.

13. A method comprising:
receiving information relating to a propagation delay variation between a first transmission and a second transmission received at a user equipment operating in a wireless communication network, the first transmission being received from a first transmission point and the second transmission being received from the second transmission point;
evaluating the information relating to the propagation delay variation; and
based on the result of the evaluation, determining if the second transmission point is acceptable as a participant in a cooperative multi-point joint processing transmission to the user equipment in which participants coordinate transmission of same data to arrive at the user equipment at a same time,
wherein the information relating to the propagation delay variation comprises one or more of phase modulation information and time offset information.

14. The apparatus of claim 13, wherein the information relating to the propagation delay variation comprises an indication that the variation between the first and the second transmissions is too great for advantageous jointly processed transmission.

15. The apparatus of claim 14, wherein the information relating to the propagation delay variation comprises an identification of one or more transmission points as ineligible for advantageous jointly processed transmission.

16. The method of claim 13, further comprising:
receiving information relating to propagation delay variations between the first transmission and each of a plurality of additional transmissions that are in addition to the second transmission, each of the additional transmissions being received from one of a plurality of additional transmission points;
operating a processor to evaluate the information relating to propagation delay variations between the first transmission point and the second transmission point, and between the first transmission point and each of the additional transmission points; and
operating the processor to construct, based on the evaluations, a set of transmission points acceptable as participants in a cooperative multi-point joint processing transmission to the user equipment.

17. An apparatus comprising:
a processing system comprising at least one processor and a memory storing a set of computer instructions, wherein the processing system is configured to:
cause the apparatus to receive a coordinated multi-point joint processing transmission in which participants coordinate transmission of same data to arrive at a user equipment at a same time;
evaluate information relating to a propagation delay variation between different received signal components of the transmission; and
based on the evaluation, determine whether the propagation delay variation is within acceptable limits,
wherein the information relating to the propagation delay variation comprises one or more of phase modulation information and time offset information.

18. The apparatus of claim 17, wherein the processing system is configured to cause the apparatus to report the determination as to whether the propagation delay variation is within limits to a network element controlling one or more transmission points in a wireless communication system.

19. The apparatus of claim 18, wherein the processing system is further configured to report the identification of the one or more transmission points to a network element controlling one or more transmission points in a wireless communication system.

20. The apparatus of claim 17, wherein the processing system is configured, if the propagation delay variation is not within acceptable limits, to cause the apparatus to identify one or more transmission points whose contribution is not within acceptable limits.

* * * * *